United States Patent [19]

Abbott

[11] 4,264,919
[45] Apr. 28, 1981

[54] CANCELLING CROSS MODULATION IN TWO COLOR TV SIGNALS PASSED THROUGH NON-LINEAR PATH

[75] Inventor: Liston Abbott, East Windsor, N.J.
[73] Assignee: RCA Corporation, New York, N.Y.
[21] Appl. No.: 52,783
[22] Filed: Jun. 28, 1979
[51] Int. Cl.³ .............................................. H04N 9/38
[52] U.S. Cl. ........................................ 358/16; 358/36; 358/11
[58] Field of Search ................... 358/11, 12, 15, 16, 358/35, 36, 37, 21

[56] References Cited

U.S. PATENT DOCUMENTS 4,120,001  10/1978  Abbott et al. ........................... 358/11

Primary Examiner—John C. Martin
Attorney, Agent, or Firm—Samuel Cohen; Carl V. Olson

[57] ABSTRACT

When two color television signals are transmitted over a common non-linear path, such as a transponder in a communications satellite, the two color subcarriers at slightly different frequencies cross modulate each other and produce disturbances on the screens of color monitors and receivers. The color cross talk can be cancelled by delaying alternate lines between horizontal synchronizing pulses of solely one of the television video signals by half the period of the color subcarrier at the transmitting terminal, and delaying intermediate lines between horizontal synchronizing pulses of solely the same television video signal by half the period of the subcarrier at the receiving terminal. Color synchronizing disturbances in television receivers receptive to the same one of the video signals are avoided by cancelling the color subcarrier frequency components on the horizontal synchronizing pulses of the video signal at the receiving terminal.

3 Claims, 5 Drawing Figures

CANCELLING CROSS MODULATION IN TWO COLOR TV SIGNALS PASSED THROUGH NON-LINEAR PATH

This invention relates to systems for the transmission of two color television signals over a common non-linear path. The invention is especially useful in systems in which a plurality of different color television signals are transmitted from a ground station to a satellite in which the signals are amplified and then returned to a ground station remote from the transmitting ground station. The receiving ground station may forward the television signals to nearby television transmitting stations which broadcast to television receivers in a local area of about 50 miles radius.

The amplifiers in the transponders in the satellites are traveling-wave-tube amplifiers because they are light in weight, use a minimum of electric power and have high gain. The requirements are such that the amplifiers cannot be made to have a linear amplification characteristic. This is not a serious disadvantage because normally only one color television signal is amplified in each transponder. However, when it is desired to amplify two color television signals in a single transponder, the color subcarriers of the two signals cross modulate each other in the non-linear traveling-wave-tube amplifier. The color subcarriers in NTSC video signals from different sources may differ from the standard frequency of 3.58 MHz by any amount up to 10 Hz, and thus may differ from each other by up to 20 Hz. The cross modulation or cross talk in the transponder of the two subcarriers results in a visible disturbing color flicker on the screens of television monitors and receivers.

In accordance with the teachings of U.S. Pat. No. 4,120,001 issued on Oct. 10, 1978, to Liston Abbott et al. on a "System For Passing Two Color TV Signals Through Non-Linear Path", and assigned to the assignee of this present application, the color flicker on the screen of a monitor or receiver is made invisible to the human eye by delaying alternate lines of one of the two video signals by half the period of the color subcarriers at the transmitting terminal, and by delaying intermediate lines of the same one of the two video signals by half the period of the color subcarrier at the receiving terminal.

The amplification of the two video signals in a non-linear transponder also causes a cross modulation of color frequency components from each video signal to the horizontal synchronizing pulses of the other. The color subcarrier frequency cross modulation which is superimposed on the horizontal synchronizing pulses of the video signal which had alternate and intermediate lines delayed can cause color synchronizing disturbances in certain classes of television receivers to which the video signal is transmitted.

In accordance with an example of the present invention, the color synchronizing disturbance is avoided by delaying the video signal an amount equal to one-half the period of the color burst frequency, and combining the delayed video signal with the undelayed video signal during solely the horizontal synchronizing pulses of the video signal, so that the color cross modulation on the horizontal synchronizing pulses is cancelled.

Figure 1:
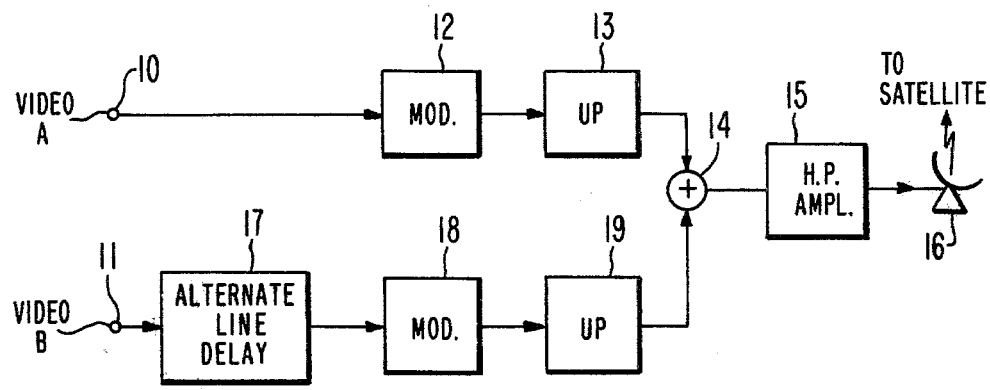
FIG. 1 is a block diagram of equipment at a ground station for transmitting two television signals up to a repeater satellite.

Referring now to the transmitting equipment of FIG. 1, one NTSC composite video television signal A is applied to an input terminal 10, and another NTSC composite video television signal B is applied to an input terminal 11. Video signal A is used to frequency modulate a carrier wave in modulator 12. The output of the modulator is translated up in unit 13 to a higher frequency, such as one in the 6 GHz range, which is passed through a signal adder 14 and a high-power (H.P.) amplifier 15 feeding an antenna 16 pointed to a repeater satellite (not shown). The other video signal B is applied from input terminal 11 through an alternate line delay circuit 17 before being applied through a modulator 18 (like modulator 12) and an up converter 19 to the signal adder 14. The signal output of the up converters 13 and 19 each occupy a different half of the frequency range passed by the amplifier 15 and the transponder in the satellite.

Figure 2:
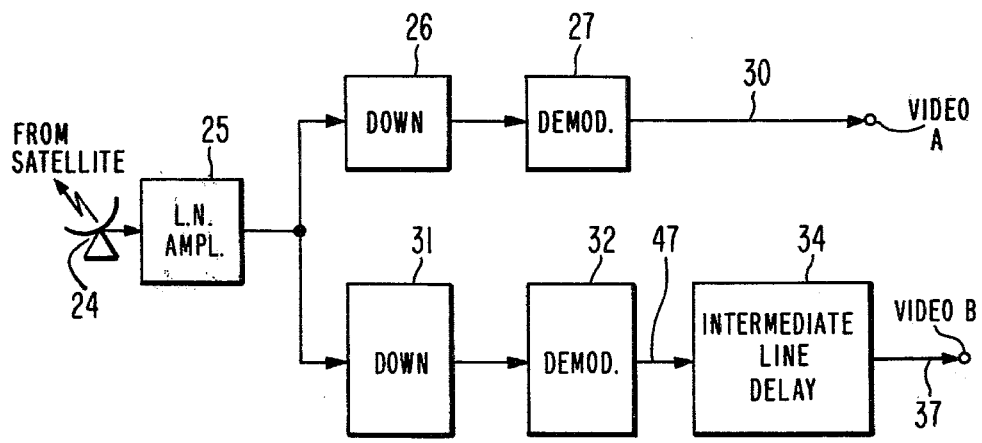
FIG. 2 is a block diagram of equipment at a remote ground station for receiving the two television signals from the satellite.

The receiving equipment shown in FIG. 2 is at a remote location on the earth and has an antenna 24 for receiving the combined television signal relayed from the satellite at a frequency such as 4 GHz. The received signal is passed through a low-noise amplifier 25, and then divided on the basis of frequency into two paths, one of which is an A-signal path including a frequency down converter 26, a demodulator 27 and to an output line 30 carrying the NTSC composite video signal A originally supplied to terminal 10 in FIG. 1. The other B-signal path includes a frequency down converter 31, a demodulator 32, and an intermediate line delay circuit 34, connected to an output line 37 carrying the NTSC composite video signal originally supplied to terminal 11 in FIG. 1.

Figure 3:
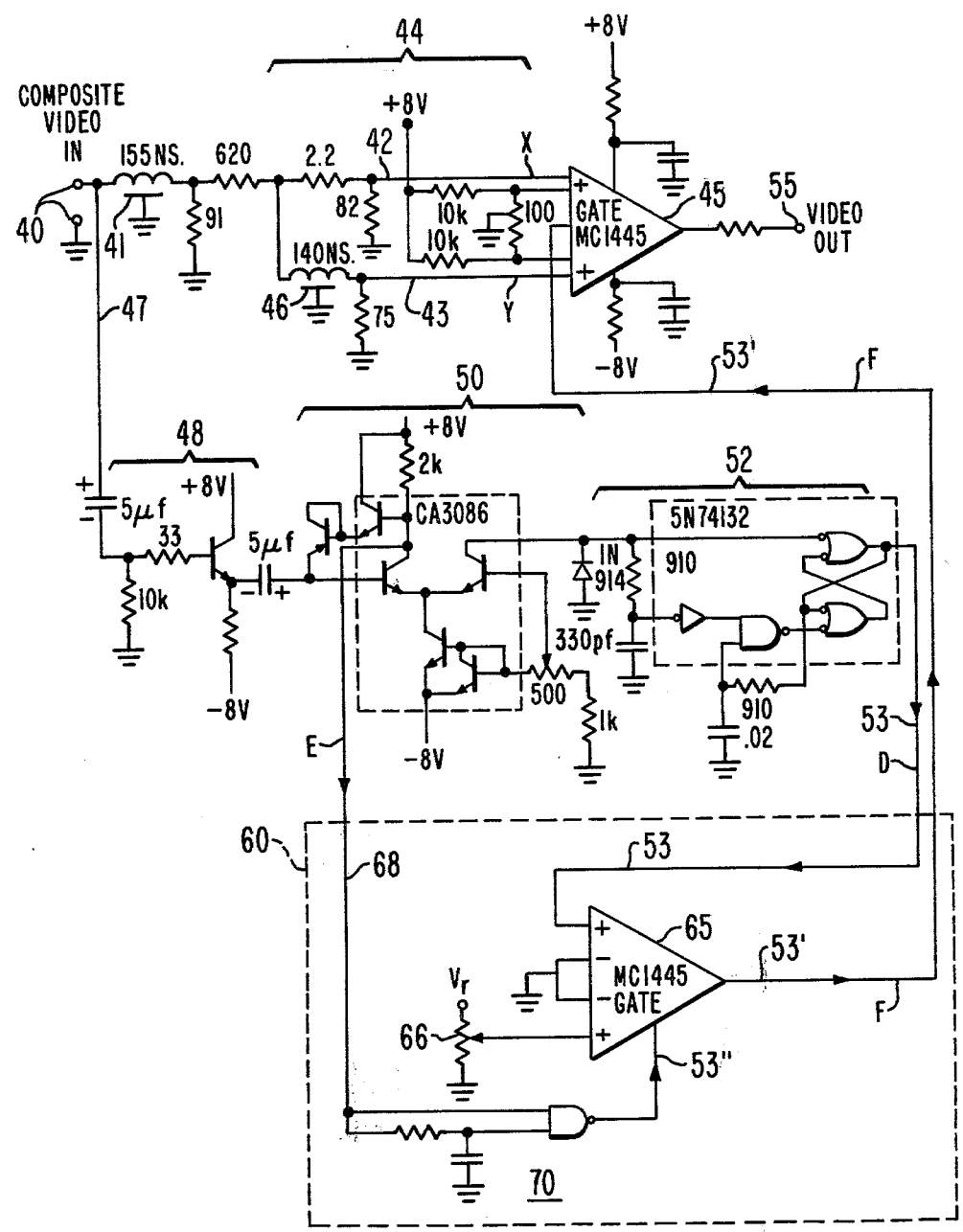
FIG. 3 is a schematic diagram of a line delay circuit which may be employed in the receiving equipment of FIG. 2.

The alternate line delay unit 17 in FIG. 1 may be constructed as shown in FIG. 3 of U.S. Pat. No. 4,120,001. The intermediate line delay unit 34 in FIG. 2 may be constructed as shown in FIG. 3 herein, which differs from FIG. 3 in the patent in having an additional circuit 60. In FIG. 3 herein, a composite video signal input terminal 40 is coupled through a 155-nanosecond delay unit 41 and through two paths 42 and 43 of an attenuating and impedance matching network 44 to two respective input terminals X and Y of a switching amplifier 45. The path to input terminal Y includes a 140-nanosecond delay unit 46 which delays the video signal an amount equal to a half cycle of the color subcarrier having a frequency of 3.58 MHz. The amplifier 45 may be a Type MC1445 Gate-Controlled Two-Channel-Input Wideband Amplifier by Motorola Corp.

The delay unit 41 is provided for the purpose of compensating for the delay introduced by gate generator circuits in a parallel path including a line 47, an emitter follower 48, a sync clamp and stripper 50, an alternate line gate signal generator 52, a line 53, a circuit 60 and a line 53' to the "gate" input of the switching amplifier 45. The alternate line gate circuit 52 responds to the composite sync signal from circuit 50 to produce a gate signal on lines 53 and 53' which causes the switch amplifier 45 to pass alternate horizontal lines of the video signal delayed by delay unit 46 and applied to input Y of switching amplifier 45, and to pass intermediate horizontal lines of the undelayed video signal applied to input X of the switching amplifier 45.

Figure 5:
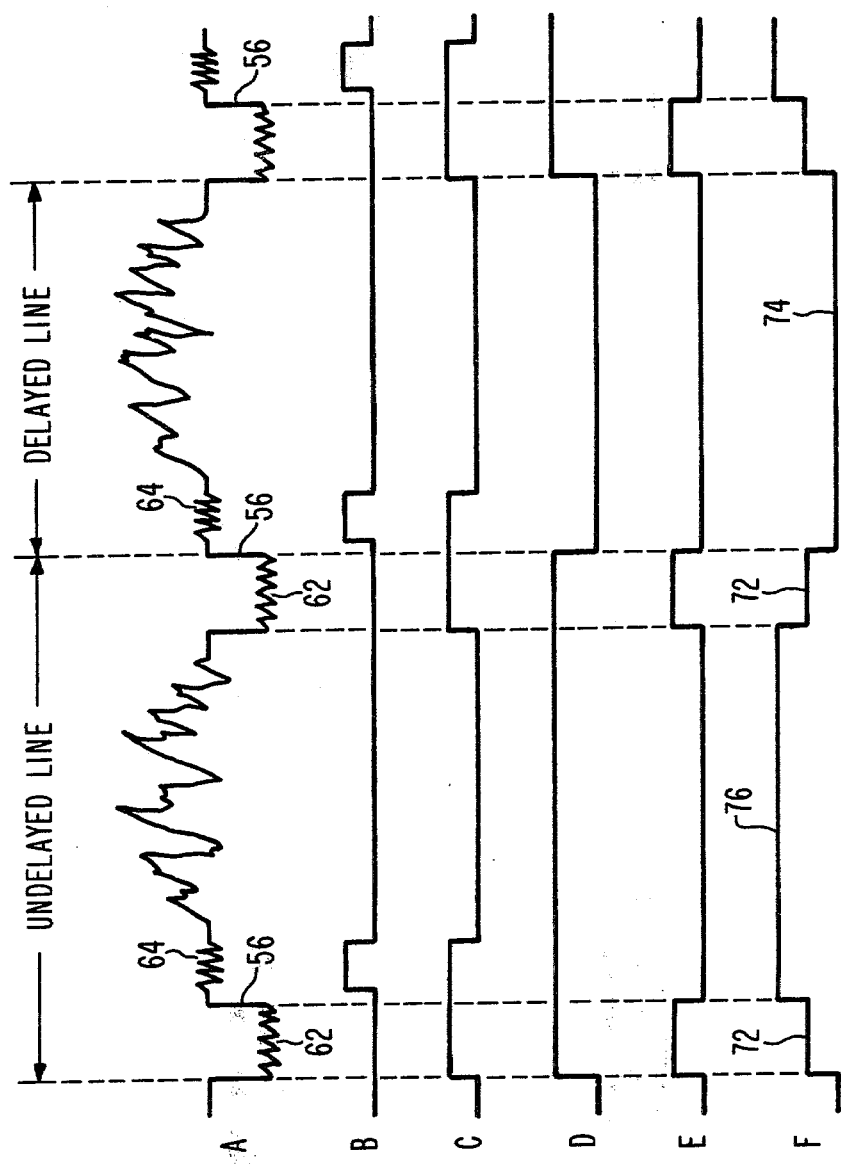
FIG. 5 is a chart of waveforms which will be referred to in describing the operation of the system of FIG. 3.

The alternate line gate signal from generator 52 is also characterized in being asymmetrical, as shown by waveform D of FIG. 5, so that all horizontal synchronizing pulses 56 in FIG. 5A appearing at the output of switching amplifier 45 are from the undelayed video signal applied to input terminal X of the switch 45. The alternate horizontal lines delayed by delay device 46 and passed through switch 45 include solely the video horizontal line signals existing between the horizontal synchronizing pulses 56. Alternate video horizontal lines are delayed, but horizontal synchronizing pulses are not delayed. This arrangement prevents the horizontal synchronizing pulses appearing at the output of switching amplifier 45 from being alternately delayed and undelayed, a condition which would interfere with horizontal synchronization of pictures on the faces of TV monitors and receivers to which the output video signal might be applied.

While none of the horizontal synchronizing pulses appearing at the video output 55 in FIG. 3 are delayed the amount 140 ns of a half cycle of the color subcarrier frequency, each horizontal synchronizing pulse is made by circuit 60 to consist of an undelayed pulse having an undelayed leading edge combined with a delayed version of the same pulse, for the purpose of cancelling color subcarrier frequency components cross modulated on the pulse from the other television signal amplifier in the common non-linear path in the satellite. This color subcarrier frequency component from the other television signal is shown at 62 on the horizontal synchronizing pulses 56 in waveform A of FIG. 5. It has a frequency and phase slightly different from, and varying relative to, the frequency and phase of the color subcarrier bursts 64. The cross modulation 62 on the horizontal pulses 56 does not adversely affect the color synchronizing operation of color television receivers having a burst gate, as shown by FIG. 5B, which admits solely the color bursts 64 to the color subcarrier synchronizing circuit in the receiver. However, color television receivers having an extended burst gate, as shown by FIG. 5C, admit the disturbing frequency component 62 to the color synchronizing circuit in the receiver, and cause the synchronizing circuit to operate erratically in attempting to synchronize the local color oscillator in the receiver with the disturbing frequency 62 on the horizontal synchronizing pulse as well on the burst 64. The disturbing frequency 62 on the horizontal pulses 56 is cancelled by the operation of the circuit 60 in FIG. 3.

Circuit 60 includes a video switching amplifier 65 which may be a Motorola Type MC1445 Gate-Controlled Two-Channel-Input Wideband Amplifier. The output 53 from alternate line gate signal generator 52, as shown by waveform 5D, is applied to one input of switch 65. A reference voltage from a voltage divider 66 and source $V_r$ is applied to the other input of switch 65. The output 53' of the switch, as shown by waveform 5F, is applied to the gate input of switching amplifier 45. Switch 65 is controlled by a pulse wave, as shown by FIG. 5E, on line 68 from horizontal sync stripper circuit 50. The pulse, coinciding with the horizontal synchronizing pulse on the received composite video signal, is delayed the very small amount of 140 ns by delay circuit 70 (to match the delay of circuit 46) before being applied to the gate input of switch 65. The switch 65 connects the signal D on line 53 to the line 53' at all times except during the horizontal synchronizing pulses, when an intermediate reference voltage is connected from voltage divider 66 to line 53'.

In the operation of the circuit of FIG. 3, the switching amplifier 45 connects an undelayed line (FIG. 5) of video signal B (FIG. 2) at X (FIG. 3) to the video output 55, followed by a delayed line of the video signal B at Y, and so on in alternating fashion. This is accomplished by the gate signal, FIG. 5D, applied to switch 45 from the alternate line delay gate circuit 52, as described in U.S. Pat. No. 4,120,001, supra, for the purpose of cancelling visible color cross talk in the color picture from the other video signal A.

The gate signal D on line 53 from gate circuit 52 is modified by circuit 60 during time E of horizontal synchronizing pulses 56 before being applied to the gate input of switching amplifier 45. The modification consists of inserting a reference intermediate voltage 72 on waveform F from divider 66 during the presence of horizontal synchronizing pulses 56. The reference intermediate voltage applied over line 53' to the gate input of switching amplifier 45 causes both the undelayed input at X and the delayed input at Y to be mixed in the amplifier 45 during horizontal synchronizing pulses. Potentiometer 66 is adjusted so that equal values of undelayed and delayed inputs are added. The cross modulated color synchronizing frequency component delayed 140 ns by delay unit 46 cancels the undelayed frequency component because of the 180 degree phase relationship of the frequency components. The cancellation of the cross modulation color subcarrier frequency component 62 during horizontal synchronizing pulses 56 removes it as a disturbing influence on the color synchronizing circuits in color television receivers receiving the video signal B. The cancellation is accomplished without any change in the timing of the horizontal synchronizing pulses. The delay unit 70 does not change the timing of the leading edges of the horizontal synchronizing pulses, but merely delays the start of subcarrier cancellation until the half-cycle-delayed component first appears.

When waveform 5F is at level 74, the video signal between horizontal synchronizng pulses is delayed. When the waveform is at level 72 during horizontal synchronizing pulses, there is cancellation of color subcarrier frequency cross talk on the pulses. When the waveform is at level 76, there is no delay of the video signal.

Figure 4:
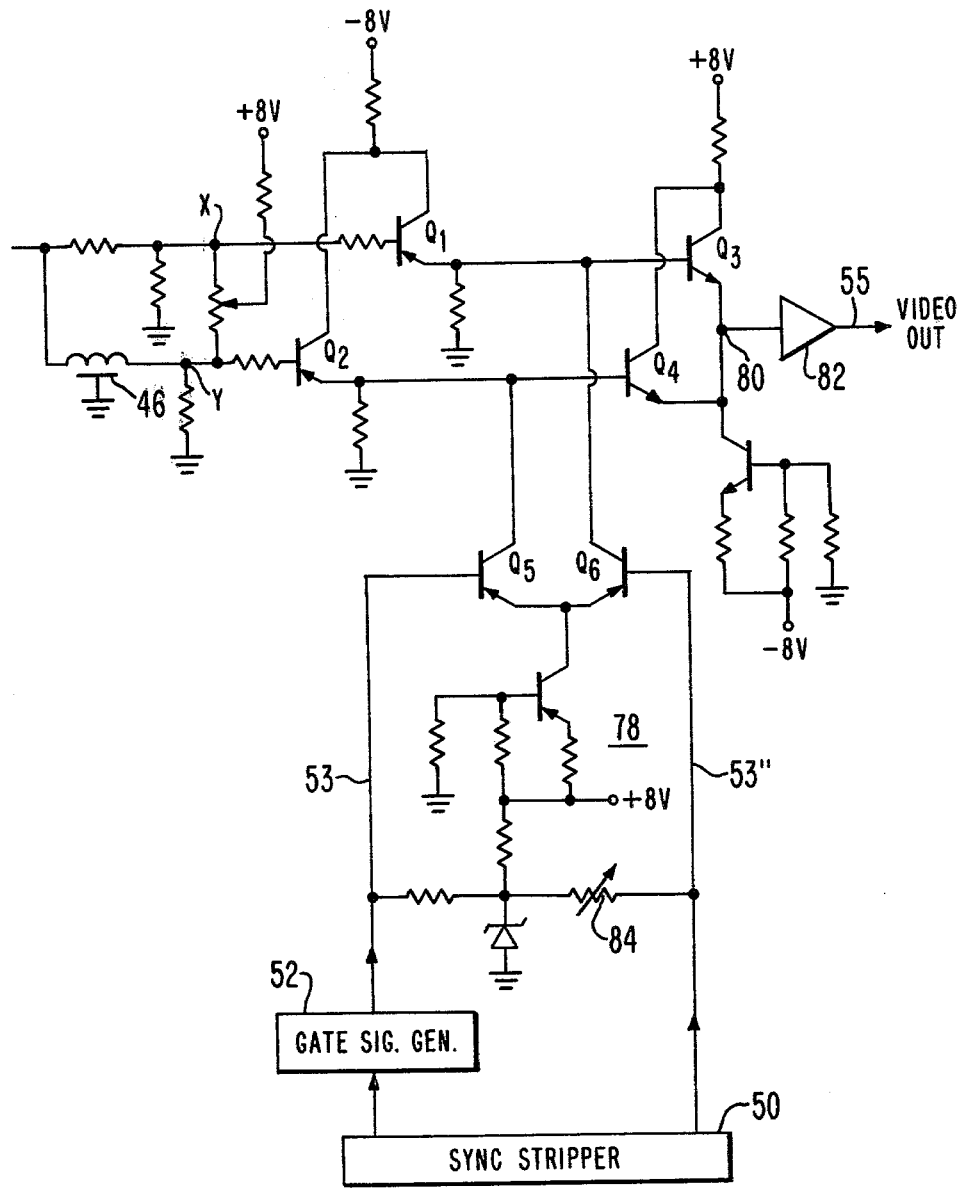
FIG. 4 is a schematic diagram of alternative circuits which may be employed in the receiving equipment of FIG. 2.

FIG. 4 shows a switching circuit which may be substituted for the switching amplifiers 45 and 65 in FIG. 3 to provide a more rapid switching of undelayed and delayed versions of the video signal to the output line 55. The undelayed video at X is coupled through transistors Q1 and Q3 to summation point 80, or the delayed video at Y is coupled through transistors Q2 and Q4 to point 80, depending on whether transistor Q5 or transistor Q6 is conducting the constant current supplied from the constant current circuit 78. Transistors Q5 and Q6 operate in differential fashion under control of a signal on line 53 from alternate line delay gate signal generator 52 to switch undelayed and delyed video signals through amplifier 82 to video output 55. Transistors Q5 and Q6 operate in equal balanced fashion under control of a pulse on line 53" from sync stripper 50 to switch equal amplitudes of the undelayed and delayed video to output Q5 solely during the horizontal synchronizing pulses. The equal balance is achieved by an adjustment of variable balance resistor 84 in the constant current circuit 78. The operation of the circuit of FIG. 3 when the FIG. 4 switch is substituted therein functionally the same as has been described with references to waveform F of FIG. 5.

The circuit for cancelling color subcarrier frequency crosstalk on horizontal synchronizing pulses is needed solely in unit 34 in the path of video B in FIG. 2. The corresponding cross talk from video signal B to the horizontal synchronizing pulses of video signal A does not disturb color synchronization in television receivers receptive to video signal A. The reasons for this is that alternate horizontal lines of video signal B are delayed at the transmitting terminal of FIG. 1, and therefore the phase of the color subcarrier frequency component cross modulated on to the horizontal synchronizing pulses of video signal A reverses from line to line. The color synchronizing circuit of a television receiver receptive to video signal A is not affected by the color subcarrier frequency cross talk on the horizontal pulses because the phase of the color subcarrier cross talk reverses from line to line, and thus is unable to disturb the synchronization of the local color oscillator in the receiver by the received color burst of video signal A.

What is claimed is:

1. In a system in which two color television video signals having slightly different color subcarrier frequencies are transmitting over a common channel, means to minimize the effects of cross modulation of the two color subcarriers, comprising
    means at the transmitting end to delay alternate lines of one of said video signals by the amount of half the period of the color subcarrier,
    means at the receiving end to delay the intermediate lines of said one video signal by the amount of half the period of the color subcarrier, and
    means at the receiving end to cancel the color subcarrier frequency components occurring during horizontal synchronizing pulses in said one video signal.

2. A system according to claim 1 wherein said means to cancel color subcarrier frequency components comprises
    delay means to delay said one video signal an amount equal to one half the period of the color subcarrier frequency, and
    switch means to combine the delayed video signal with the undelayed video signal during the horizontal synchronizing pulses.

3. A system according to claim 2 wherein said switch means is operated by a signal derived from the horizontal synchronizing pulses of said one video signal.

* * * * *